United States Patent [19]

Webb

[11] Patent Number: 4,753,809

[45] Date of Patent: Jun. 28, 1988

[54] COUNTRY HAM CURING PROCESS

[76] Inventor: Neil B. Webb, 3309 Drake Cir., Raleigh, N.C. 27607

[21] Appl. No.: 784,473

[22] Filed: Oct. 4, 1985

[51] Int. Cl.$^4$ ............................. A23B 4/02; A23B 4/04
[52] U.S. Cl. ..................................... 426/235; 426/248; 426/264; 426/265; 426/266; 426/272; 426/274; 426/315; 426/641
[58] Field of Search ............... 426/235, 241, 272, 274, 426/281, 315, 264–266, 641–645, 248

[56] References Cited

U.S. PATENT DOCUMENTS

| | | | |
|---|---|---|---|
| 1,503,864 | 8/1924 | Vogt | 426/645 X |
| 2,169,081 | 8/1939 | James | 426/248 X |
| 2,629,311 | 2/1953 | Graves | 426/281 X |
| 2,713,002 | 7/1955 | Williams | 426/248 X |
| 3,134,678 | 5/1964 | Wierbicki et al. | 426/266 |
| 3,300,990 | 1/1967 | Jaremus | 426/248 X |
| 3,896,242 | 7/1975 | Moore | 426/315 X |
| 3,989,851 | 11/1976 | Hawley et al. | 426/641 X |
| 4,029,824 | 6/1977 | Langen | 426/281 X |

OTHER PUBLICATIONS

Komarik, S. L. et al., "Food Products Formulary", vol. 1, The Avi. Publ. Co., Inc., Westport, Conn., 1974, pp. 1–18.

*Primary Examiner*—Donald E. Czaja
*Assistant Examiner*—Mary S. Mims
*Attorney, Agent, or Firm*—William C. Lawton

[57] ABSTRACT

A novel process for curing whole hams and improved boneless hams comprising the steps of mixing the ham or ham portions with a cure mix; storing the hams for a period of days; smoking the hams; subjecting the hams to ultraviolet light for a period of days; aging the hams under ultraviolet light for a period of days; forming the hams or ham portions after excess fat removal and trimming to a desired form or shape; cooking the hams for a period of hours at reduced humidity to facilitate trichina destruction, binding and moisture removal from said hams; chilling the hams to a reduced temperature; and packaging the resulting ham product; wherein each stage is conducted under particular parameters of time, temperature and humidity.

15 Claims, No Drawings

COUNTRY HAM CURING PROCESS

BACKGROUND OF THE INVENTION

The preservation of pork products, including ham, by the application of a curing mixture consisting essentially of salt and saltpeter has been utilized for many centuries. It was, in fact, one of the first methods of meat preservation used in colonial America. It was the practical method of meat preservation in order to have adequate supplies at times when the preservation of fresh meats could not be obtained and spoilage was imminent. The purpose of the process is to increase the salt concentration in the muscle portions of the ham while lowering the moisture content. The increased salt concentation ihhibits microbiological deterioration and slows enzyme activity.

Such salt-cured products have been historically identified in the United States as "country ham", and it is a dry-cured pork product which has become widely accepted throughout the United States, and the southeastern United States in particular. Country ham products continue to enjoy an increase in distribution in the other sections of the United States.

In recent time, the country ham product has been considered a delicacy and a specialty product which has acceptability among consumers primarily for its favor and texture, the curing process not now being considered as essential for preservation as has been required in previous eras prior to the onset of refrigeration technology.

Historically, the process of curing country ham has involved the application of curing mixtures, consisting of various ingredients such as salt, sugar, sodium nitrite, and sodium nitrate and spices, to obtain a desired level of salt concentration, the simultaneous reduction of moisture content and the development of the characteristic cured country ham flavor. There are various processes for the curing of country ham. Some processes do not add the sodium nitrite or sodium nitrate, but simply preserve the ham by the application of conventional salt. Other processes involve smoking the ham to obtain additional preservation on the surface as well as to add the characteristic smoked flavor. In all of these processes the curing and aging process for country ham is accomplished for a bone-in ham. Any subsequent preparation of country ham requires extensive carving and cutting of the product after it has been cured and aged.

This currently used system requires major workmanship for the removal of the bone, skin and fat to obtain the desired cuts of leaner meat, with only the large muscle sections being subject to adequate portioning.

To the knowledge of the inventor there has been no successful process developed for the complete curing and aging of boneless country hams. Additionally, there is no process known to this inventor that would allow the boneless muscle sections to be sectioned, formed and subsequently bound or held together. This is one of the primary objects of the present invention, although this ihvention can be used for curing bone-in ham portions.

In today's market, a country ham is required that is uniformed in portion size, relatively free of fat, with the bone and skin removed prior to its use. One reason for the market requisite of uniformity is the rapidly burgeoning fast food breakfast market that is experiencing significant growth throughout the United States. The uniformity requirement especially needed in the preparation of portion-sized cuts of meat for institutional and restaurant operations. Portion size cuts of meat are equally attractive to the retail market, primarily from the standpoint of precision in control of inventories, economic storage and shipping, and a consequent uniformity in pricing for the consumer.

Through extensive research, the process claimed in this invention is unique and has not been previously reduced to practice successful on a experimental scale, much less a commercial scale. The process of the present invention is effective for commercial production and does result in a ham product that can be uniformally sized, arid uniformally cured for a product that is predictable in weight, shape and taste. When this process is used in the production of a boneless ham section, it is generally desired that the removal of bone, skin and excess fat can be conducted prior to processing according to the present invention especially when applied to boneless muscle portions or sections, there is a more uniform distribution of curing ingredients and a more effective binding of the muscle sections for portioning. There is clearly a reduction in labor of processing such country ham products.

Also, by the control of the unique conditions applied during the processing according this invention, the process allows for improved control of the composition (protein, moisture, fat and salt) of the finished product. It also provides for an effective application of the curing compounds which enables an extraction of some muscle protein which subsequently effects the binding of separate muscle portions together to obtain a more characteristic solid muscle structure in the finished product, especially where multiple pieces of ham or muscle sections are joined together in the forming step of this invention for production of a finished product. The process employed in this invention provides for very effective control of microbiological growth in the ham product.

The process of this invention provides for a uniform tasting country ham product effectively cured to prevent the growth of micro-organisms. When applied to boneless ham products, the process allows for the extraction of myosin protein by mixing and massaging the muscle portions with a commerical curing mixture. This protein is very effective in the subsquent binding and adherence of lean muscle portions in the preparation of uniform portion cuts of meat according to this process. The process allows the preparation of a country ham in a boneless condition from the start of the curing operation and develops a standard country ham in a significantly shorter period of time than conventional processing. The uniformity in composition of the finished product results in a more precisely controllable production process and a uniformity in controlling the safety of the product and the process. The process is adaptable to conventional production of boneless country ham portions on a large scale with greater efficiency than previously known in the processing of country ham products. Obviously, the process does facilitate all of the known benefits of country ham curing including the destruction of the trichina parasite and a process for more complete control of microbial growth on ham products.

In the further description of the invention herein, there will be discussion of specific parameters of time, temperature, humidity, air flow, etc. These parameters are disclosed in both broad and narrower ranges. The broad ranges disclosed in this invention are known to produce a satisfactorily cured final product. However, variations in the broad ranges can result in a variation in taste and consistency of the final product.

The preferred ranges discussed in this specification results in a particularly desirable uniform product with a predictable taste and consistency. It is believed that the product produced by the process under the preferred condition results in a more commercially acceptable product. However, it is to be stated at the outset that variations in the parameters within the broad ranges will result in a finished product that is suitable for safe consumption and use but may not be as desirable from a taste or uniform portion size standpoint for commercial production and institutional use.

Clearly deviations within the broad ranges are permissible without deviating from the scope of this invention. The preferred ranges are offered by way of illustration, and not by way of limitation, of the scope of this invention.

OBJECTS OF THE INVENTION

It is an object of the present invention to provide a process for the large scale manufacture of whole ham sections and boneless ham sections.

It is a further object of this invention to provide a process for the large scale production of boneless country hams with a uniform and predictable product size and taste for institutional and large scale retail use.

It is a further object of the present invention to provide for the first time a complete process for the production of a standardized country ham product for the commercial market without the inherent difficulty in cooking and serving currently posed by conventionally cured and produced whole hams.

Still further objects will become apparent from reading of the specifications and claims herein.

DETAILED DESCRIPTION OF THE INVENTION

The process of the present invention can be applied to ham portions of any desired size with the bone still in the ham portion. The process was, however, particularily developed for the production of boneless country ham products. The process of the present invention comprises the sequential steps of boning and skinning the ham portions; the application of a conventional curing compound to the ham portions; the storage of said treated ham portions for a period of time; an optional further cure application depending on the ultimate product taste desired; a smoking step; a further storage step for the purpose of equalizing the cure of the ham portions; aging of the thus cured ham portions; forming of the ham portions to desired shape; cooking of the formed ham portions and subsequent chilling thereof; an optional further ripening step to improve the flavor of the ham portions; and final packaging processing as desired.

In order to facilitate the detailed description herein, each of the various steps will be described with particular reference to the process step, its purpose, and both the broad and the preferred parameters under which each step is conducted.

It is believed that this format for description of the invention will facilitate a clearly understanding of an otherwise complex curing process.

When a boneless country ham product is to be prepared the first step is a rather conventional one of removing all the skin from the ham portions and the removal of any bones. As in most curing processes there is an amount of fat, standard in the industry that is left on the meat portions to provide pliability and flavoring.

The first truly mechanical step of the process of this invention is the initial application of the curing compounds. The only requirement for the amount of cure is that it be in a sufficient amount to prevent the growth of micro-organisms on the hams. The cure mix does effect the final taste of the product. It is within the contemplation of the present invention that the application of any commercial cure is suitable so long as it is in sufficient quantity to prevent microbial growth. For instance, a satisfactory cure involves standard salt in the amount of 98.2% by weight, sodium nitrite in the amount of 0.6% by weight and sodium nitrate in the amount of 1.2% by weight. An example of a satisfactory amount of cure is 3.0 pounds/cwt based upon the fresh boneless weight of the ham. The cure can be mixed with the ham or ham portions for a time period of from ten minutes up to ten hours at a temperature of from 25° to 45° F. The temperature ranges chosen because it is desirable that the ham not be frozen, but at the time that there be no cooking of the ham muscle. If the ham and curing compound ar placed in a mixer/tumbler and rolled together during the application of the cure, the final product can be improved. If the mixing is done in this matter, the speed of the tumbler can be in the range of one to thirty revolutions per minute. The mixing simple facilitates the speed with which the cure compound is placed in contact with the surface of the ham. The most prefered temperature for the application of this cure is in the temperature range of from 35° to 40° F.

In the second step of this invention, the hams which have had the cure applied to them are stored for a time period of from three to twenty-one days at a temperature of from 25° F. to 50° F. Air circulation in this storage process is helpful in the process but is certainly not a critical factor. The humidity in this storage process is generally uncontrolled and is known to be as high as 85 to 90%. The presence of humidity in the storage step is not critical to the success of the process.

At this point in the process the next step is generally a smoking step. However, optionally in the process of this invention there can be a second step involving the application of any commercially available cure mix wherein the hams are subjected to the application of a cure, again in sufficient quantity to preven the growth of micro-organisms on the hams. This step is generally conducted for from ten minutes to ten hours at a temperature of from 25° to 50° F. The amount of cure in this step is generally less than the initial curing step. For example, in this curing step it is a satisfactory to use 1.5 pounds/cwt based upon the fresh boneless weight of the ham. Similarily to the initial curing step, this curing step can be conducted in a mixture/tumbler which improves the curing compound contact with the ham, and can improve the final product. However, such tumbling of the ham and cure mix is not critical to the success of the process. As in the initial curing step, the massaging of the ham portions and the cure mix does assist in the binding of the meat portions in the subsequent forming step.

The next step in the process involves smoking the hams at a commercially standard air flow. This is conducted in commercially known smoking chambers for a time period of from one to four hours at a temperature of from 40° F. to 125° F. at an atmospheric humidity of generally not more than 20%. The amount of smoke contacted with the hams does dictate the time of the smoking step. For example, where a heavy smoke is used, the smoking step can be conducted for approximately one hour; with a light smoke application, the smoking step can generally take up to four hours. The temperature range is admittedly broad. The upper range can be critical to the successful production of a good final product. It is generally not desirable to go above 124° F. because it is detrimental to cause a heatset or coagulate the muscle in the ham portion. It is generally not desirable to go below 40° F. At these lower temperatures condensation occurs on the hams and the meat will not absorb the smoking. The humidity level must generally be low. The range will be whatever normal air holds at the temperature at which the smoking is conducted. Generally it is undesirable for there to be any humidity added to the normal air content in this step. It should be stated that the amount of smoke added to this step is really a matter of taste, the only real requirement is that the smoke should be added in sufficient amount that it will inhibit bacterial growth.

The next step in the process is that of equalizing the cure of the ham. This step allows the migration of the cure mix uniformally throughout the ham portions. This step allows the time necessary for the cure to penetrate uniformally through muscles of varied thicknesses. This step also facilitates moisture loss through evaporation in the product being produced. The cure equalizing step is one wherein the hams are maintained at a temperature in the range of 30° F. to 50° F. for a period of time of from three to twenty-one days. This step is conducted at an atmospheric level of humidity from 40% to 100% while subjecting the hams to ultraviolet light sufficient to inhibit microbial growth in the hams. In this step an air flow is generally maintained over the hams at a rate standard for cooling unit air flow known in the industry. A period of around ten days for this step has been shown to generally produce the best results in the final product. The temperature range is based primarily upon the fact that a temperature below 10° F. there is virtually no migration of the curing salts in a reasonable and commercially acceptable time period. At a temperature above 50° F. there will be some spoilage of the product. The higher humidity levels found in this step are a result of the ham portions losing moisture during the step. The humidity level needs to be controlled somewhat due to concern for the possible growth of micro-organisms at very high humidities for extended time periods. Therefore, the preferred humidity levels would be in the 50% to 75% range. In the cure equalizing step, the hams are subjected again to ultraviolet lights sufficient to cover the top surfaces of the ham product or portions. If it is determined that bacterial growth is occurring on the bottom of the ham, they can be turned during the cure equalizing step to allow the ultraviolet light to contact the underside of the hams as well.

In a preferred embodiment of the process of the present, in the step involving the initial application to cure mix, it is preferred that the hams and cure mix are mixed under mixing conditions whereby the hams and cure are mixed under rotation at a speed in the range of three to ten revolutions per minute and wherein the time of the application of the cure mix is from 15 minutes to 30 minutes at a temperature maintained in the range of from 35° F. to 40° F. The storage step is preferably conducted for a period of five to ten days at a temperature in the range of 35° F. to 40° F. If there is an additional cure application as disclosed herein, it is preferably conducted also under mixing conditions where the ham and the cure mix are mixed under rotation at a speed in the range of from three to ten revolutions per minute. The preferable time for application of the optional additional cure is from ten minutes to twenty minutes. This optional step is preferably conducted at a temperature maintained in the range of 35° F. to 40°. The smoking step is preferably conducted for a time period of from two to three hours during which a moderate amount of smoke is applied at a temperature of from 70° F. to 100° F. In the cure equalizing step in the preferred embodiment of the invention, the equalizing is conducted at a temperature in the range of from 35° F. to 45° F. for a period of time of from seven days to ten days wherein the atmospheric humidity is maintained during said step at a level of from 70% to 80%.

The next step in the process of the present invention is referred to herein as the aging step. In this process the hams are aged for a period of from two to thirty-eight days at a temperature of from 25° F. to 75° F. while the hams are maintained at a atmospheric humidity level of from 10% to 90% and subjected to ultraviolet light over at least all of the top or bottom surfaces thereof. It is preferable that there be some forced air flow over the hams during the aging of from one to twenty feet per second. The purpose of the aging step is to raise the temperature of the ham product and lower the humidity in order to remove moisture from the meat. The forced air flow is generally provided by circulating air fans. The air flow range is an estimate. The flow of air over the hams helps carry away moisture from the surface of the hams. The time period for aging is admittedly broad. Aging for more than thirty-eight days provides no further benefit to the final product. Below seven days there is generally not enough moisture removal. Admittedly, moisture can be removed faster at higher temperatures. However, at temperatures in excess of 75° F. there is a risk of microbial growth. At temperatures below 25° F., there is simply insufficient removal of moisture from the hams. If it is determined that there is any type of bacterial growth on the surfaces of the hams not in direct contact with the ultraviolet lights, the hams, as in the previous step can be turned to provide for such contact.

In the preferred embodiment of the process, the aging step can be conducted as a two stage process. In the first aging stage, the hams are aged for a period of from two to ten days at a temperature of from 35° F. to 50° F. The atmospheric humdity surrounding the hams is maintained at a level of from 60% to 70% under a forced air flow in the range of from one to five feet per second. In the successive aging step the hams are aged for a period of from two to ten days at a slightly increased temperature in the range of from 45° F. t 50° F. while the atmospheric humidity surrounding said hams is maintained at a level of 55% to 65%. In this second aging step the forced air flow is generally maintained in the same range. The final moisture content of the hams after the aging process should be in the range of from 60% to 70%. In the second aging step described herein it is preferable that the moisture content during that step be above 57% and below 65%. Moisture above 65% results in a product with a reduced shelf life, and a moisture content below 57% makes it difficult for the surfaces of the hams to bind to each other in the subsequent forming step.

The next step in the process is the formings step. In the forming step, excess fat and undesirable portions are removed from the hams or ham portions. The ham portions that have been treated up to this step are placed into any desired form at a temperature in the range of from 25° F. to 75° F. Since the process was developed to provide a boneless country ham product, in a preferred embodiment of this invention, the hams or ham portions are generally cut into pieces ranging in size from ⅛ inch chunks to full muscle sections. The size of the pieces is generally dependent upon the type of products to be formed. Obviously an entire muscle section when formed would provide a more conventional full ham type product whereas the much smaller pieces formed would appear to be more of a processed type county ham product. The temperature range established was determined by the fact that below 25° F. the ham pieces will not bind well to each other in the forming step. Above a temperature of 75° F. reduced binding is promoted as is microbial growth. Increased temperatures reduced the ability of the product to be formed. At temperatures above 75° F. the ham portions or pieces are too soft and pliable to be satisfactorily formed.

The next step in the process is the cooking step. The cooking step is necessary to reduced the moisture content of the final product. In the cooking step there is generally additional smoking for further inhibition of microbial growth and destruction of trichina parasites, if any. The cooking step is generally conducted for a period of from one hour to ten hours at an elevated temperature not in excess of 180° F. and at a atmospheric humidity level not in excess of 60%. During the cooking step, the ham portions or products ar generally subjected to standard smokehouse air flow. This air flow is known and conventional in the industry. The purpose of the cooking step is to have the final ham product reach an internal temperature in the range of from 130° F. to 150° F. Current federal law requires the internal temperature of the ham product to be at least 137° F. for there to be a killing of the trichina parasite. If the ham is certified trichina free, the temperature for cooking and heatset can be as low as 130° F. The starting temperature for the cooking process can be in the 110° F. to 140° F. range in order to make the ham product being cooked more suitable for an optional smoking during the cooking. If the internal temperature of the ham product at the end of this process is much above 150° F., the product is too tender and will be susceptible to falling apart. Similarily if the internal temperature of the cooked ham is below 130° F., in addition to the problem with the trichina parasite discussed above, the muscle sections may not stay together as well as a result of heatsetting of the muscle that is a product of this cooking step. During the cooking step it is preferable to keep the humidity as low as possible to facilitate the removal of moisture. If it is desirable to subject the ham portions to additional smoking during the cooking step, the amount of smoke at this stage is almost exclusively a matter of taste. At this time of the process most, if not all microbial growth should have been retarded. The amount of air flow referred to in this cooking step is really not critical to the process. The presence of air flow does facilitate the removal of moisture more quickly.

The preferable parameters for the cooking step involve the subjecting of the ham during the cooking step to a moderate smoke for a period of from one to five hours at a temperature in the range of 135° F. to 145° F. for thirty minutes to sixty minutes and then in the increased range of 145° F. to 180° F. for sufficient time to obtain an internal ham temperature of 137° F. or higher. In the preferred embodiment of this invention the atmospheric humidity level is maintained around the 20% level.

At this point in the process there can be conducted an optional ripening step. This ripening step, if included in the process, helps improve the flavor of the final product as well as to standardize the moisture content of the final product. In the ripening step, the hams or ham portions are ripened for a period of from one day to ten days until the ham moisture content drops to at least 60%. The step is conducted at a temperature in the range of from 50° F. to 75° F. while maintaining an atmospheric humidity level of from 10% to 80%. During the ripening step an air flow is generally maintained over the hams of from one to twenty feet per second. In the preferred embodiment of the invention this ripening step, if it is used in the process, is conducted for a period of from one to five days until the ham moisture content drops to the range of from 50% to 55%. This ripening step according to the preferred embodiment of the invention is conducted in the temperature range of from 55° F. to 65° F. at an atmospheric humidity level of from 50% to 60% and at an air flow of from one to five feet per second.

The final two steps in the process are the packaging of the ham products in any desired volume or shape and storing of the final product as desired for shipping or sale. The packaging is generally done at a temperature in the range of from 30° F. to 40° F. The packaging can be done under a vacuum, in an inert gas atmosphere, or under atmospheric conditions depending on the packaging methods utilized by a user of this process.

It should be obvious from the specification that many of the parameters under which the process of the present invention are conducted are necessarily broad. To say that there is a most preferred embodiment involving parameters within the limits of the more preferred embodiments disclosed in the specification is a matter of choice depending on taste and texture of the final product involved. One example of a specific preferred embodiment of the invention has resulted in a very well cured and tasteful boneless country ham product. This embodiment involves the application of a commercially available cure mix to boneless ham portions in sufficient quantity to prevent microbial growth on the hams while massaging the hams, wherein the cure is mixed with the hams for a period of from ten minutes to ninety minutes at the temperature of from 35° F. to 40° F. The hams and the cure are mixed together under rotation at a speed of from three to twenty revolutions per minute. The hams are then stored for a period of five to fifteen days at a temperature in the range of from 35° F. to 40° F. A second application of a commercially available cure is conducted, here again in sufficient quantity to prevent the growth of micro-organisms on the hams. The hams in this optional second cure application are massaged with the cure mix for a period of ten minutes to sixty minutes at a temperature of from 35° F. to 40° F. The ham and the cure mix are mixed together under rotation at the same speed as the initial cure application step. This ham product is then smoked at standard air flow in a commercially known smoking chamber for from two to three hours at a temperature of from 70° F.

to 100° F. at a atmospheric humidity of not less than 20%. The amount of smoke applied to the hams is moderate, the time of smoke application being dependent upon the amount of smoke applied. Once the smoking occurs, the hams are subjected to an equalizing step wherein the hams are maintained at a temperature in the range of 35° F. to 45° F. for a period of time of from nine to eleven days at an atmospheric humidity level of from 60% to 80%. In this equalizing step the hams are subjected to ultraviolet light adequate to cover at least the top or bottom surfaces of said hams. An air flow is maintained over the hams at a rate standard for cooling unit air flow known in the industry. The hams are then aged for from eight to twenty days at a temperature of from 40° F. to 55° F. while maintaining an atmospheric humidity level of from 45% to 80%. In this aging step the hams are again subjected to ultraviolet over at least all of top or bottom surfaces thereof and while there is maintained over the hams a forced air flow of from one to five feet per second. This aging step can be conducted in two stages. When conducted in two stages the aging is done initially for from two to ten days at a temperature of from 40° F. to 50° F. at an atmospheric humidity level of from 45% to 80% with a forced air flow in the range of from one to five feet per second. Then a second aging step immediately begins for a period of from two to tens day at a temperature of from 40° F. to 55° F. while the atmospheric humidity surrounding the hams is maintained at a level of from 55% to 75%. The same forced air flow is used in this step and the moisture content of the hams at the conclusion of this aging is preferably in the range of from 60% to 70%. After aging the hams, they are cooked for a period of from two hours to five hours at a temperature in the range of from 135° F. to 155° F. at an atmospheric humidity level in the range of from 10% to 25% to remove moisture from the hams. During the cooking the hams are subjected to standard smokehouse air flow. In this more preferred embodiment of the invention, the smokehouse dampers are kept closed after the first hour of the cooking step. The hams are then chilled to a reduced temperature and ripened for a period of one day to five days until the ham moisture content drops to the range just from 50% to 55%. The ripening step is conducted at a temperature of from 55° F. to 75° F. and at an atmospheric humidity level of from 50% to 70%, while maintaining an air flow over the hams of from two to five feet per second. The hams are then packaged and stored a desired.

It should be apparent that any range of parameters within those required of this process to produce a safe and tasteful country ham product can be utilized without deviating from the scope of this invention.

Having thus described my inventions, I claim:

1. A process for producing a country ham product comprising the steps of:
   a. Applying a dry cure mixt to ham portions in sufficient quantity to prevent growth of microorganisms on the ham, while massaging the hams, wherein the cure is mixed with the hams for a time of from 10 minutes to 10 hours while maintaining the ham portions at a temperature of from 25° F. to 50° F., then
   b. storing said hams for a period of from 3 to 21 days at a temperature of from 25° F. to 50° F., then
   c. smoking said hams in an air flow of 1 to 10 feet per second in a smoking chamber for a time period of from 1 hour to 4 hours at a temperature of from 40° F. to 125° F. at an atmospheric humidity of not more than 20%, then
   d. maintaining said hams at a temperature of from 30° F. to 45° F. for a period of time of from 3 to 21 days at an atmospheric humidity level of from 70% to 100%, while subjecting said hams to ultraviolet light sufficient to inhibit microbial growth, while an air flow is maintained over said hams at a rate of 1.0 to 20 feet per second whereby said cure is equalized in said ham portions, then
   e. aging said ultra-violet light treated hams for a period of from 2 to 38 days at a temperature of from 35° F. to 75° F. while said hams are maintained in an atmospheric humidity of from 10% to 90% while subjected to ultraviolet light over at least all top and bottom surfaces thereof, wherein said aging step is conducted while maintaining a forced air flow over said hams of from 1 to 20 feet per second, then
   f. removing excess fat and undesirable portions from said ham and forming said pieces into a desired shape while maintaining said ham at a temperature of from 25° F. to 75° F., then
   g. cooking said hams for a period of from 1 hour to 10 hours at a high temperature not in excess of 180° F. and at an atmospheric humidity level not in excess of 60% to remove moisture from said hams, while said hams are subjected to an air flow of 1.0 to 20 feet per second, then
   h. chilling said hams to a temperature in the range of 25° F. to 75° F. then
   i. packaging said ham at a temperature in the range of 25° F. to 75° F.

2. The process of claim 1, wherein between steps h. and i. there is conducted an additional aging step wherein said hams are aged for a period of from 1 day to 10 days until the ham moisture content drops to at least 55%, at a temperature of from 50° F. to 75° F. and an atmospheric humidity level of from 10% to 50%, while subjected to ultraviolet light and maintaining an air flow over said hams of from 1 to 20 feet per second.

3. The process of claim 1 wherein between steps b. and c. there is conducted an additional cure mix application wherein said hams are subjected to the application of the cure mix, again in sufficient quantity to prevent growth of micro-organisms on the hams, while again massaging said hams, wherein the cure is mixed with said hams for a period of 10 minutes to 10 hours at a temperature of from 25° F. to 50° F.

4. The process of claim 1, wherein step a. is conducted under mixing conditions whereby the said hams and said cure mix are mixed under rotation at a speed in the range of 3 to 10 r.p.m., wherein the time of application of said cure mix is from 15 minutes to 30 minutes, and wherein the temperature of said step is maintained in the range of 35° F. to 40° F.

5. The process of claim 1 wherein step b. is conducted for a period of from 5 to 10 days at a temperature of from 35° F. to 40° F.

6. The process of claim 3 wherein said additional cure application is conducted under mixing conditions whereby said hams and said cure mix are mixed under rotation at a speed in the range of from 3 to 10 r.p.m., wherein the time of application of said cure mix is from 10 minutes to 20 minutes, and wherein the temperature of said step is maintained in the range of 35° F. to 40° F.

7. The process of claim 1 wherein step c. is conducted for a time period of from 2 hours to 3 hours, while maintaining a temperature of from 70° F. to 100° F., and where a moderate amount of smoke is applied to said hams.

8. The process of claim 1 wherein step d. is conducted at a temperature of from 35° F. to 45° F. and for a period of from 3 days to 10 days, wherein the atmospheric humidity of said step is held at a level of from 70% to 80%.

9. The process of claim 1 wherein said aging step e. is conducted in the following two separate steps:
   a. aging said hams for a period of from 2 days to 10 days at a temperature of from 40° F. to 55° F., while the atmospheric humidity surrounding said hams is maintained at a level of from 50% to 70%, wherein said forced air flow is in the range of from 1 to 20 feet per second, then
   b. aging said hams for a period of from 2 to 10 days at a temperature of from 55° F. to 75° F. while the atmospheric humidity surrounding said hams is maintained at a level of from 10% to 50%, wherein said forced air flow is in the range of from 1 to 5 feet per second, and wherein the ham moisture content at the conclusion of this step is in the range of from 60% to 65%.

10. The process of claim 1 wherein step f. is conducted at a temperature of from 35° F. to 45° F. and said hams are cut or ground into pieces ranging in size from ⅛ inch chunks to full muscle sections.

11. The process of claim 1 wherein step g. is conducted while subjecting said hams to a moderate smoke for a period of from 1 hour to 2 hours at a temperature in the range of from 135° F. to 145° F. for 30 minutes to 60 minute and then in the range of from 145° F. to 180° F. for sufficient time to attain an internal ham temperature of 137° F. or higher, wherein said atmospheric humidity level is less than 20%.

12. The process of claim 2 wherein said aging is conducted for a period of from 1 day to 5 days until said ham moisture content drops to the range of from 50% to 55% at a temperature in the range of from 55° F. to 65° F., wherein said atmospheric humidity level is from 50% to 60%, wherein said air flow is in the range of from 1 to 5 feet per second.

13. The process of claim 12 wherein said hams are subjected to ultraviolet light adequate to cover at least all top or bottom surfaces of said hams.

14. A process for producing a country ham product comprising the steps of:
   a. applying a dry cure mix to a ham portions in sufficient quantity to prevent growth of micro-organisms on the hams, while massaging the hams, wherein the cure is mixed with the hams for a time of from 10 minutes to 90 minutes while maintaining the ham portions at a temperature of from 35° F. to 40° F., wherein said hams and cure are mixed together with rotation at a speed of from 3 r.p.m. to 20 r.p.m., then
   b. storing said hams for a period of 3 to 10 days at a temperature of from 35° F. to 50° F., then
   c. applying a second application of a dry cure mix again, after storage for 5 days, in sufficient quantity to prevent growth of micro-organisms on the hams, while again massaging said hams, wherein the cure is mixed with said hams for a period of 10 mintues to 60 mintues while maintaining the ham portions at a temperature of from 35° F. to 40° F., wherein said hams and cure are mixed together under rotation at a speed of from 3 r.p.m. to 20 r.p.m., then
   d. smoking said hams in an air flow of 1.0 to 10 feet per second in a smoking chamber for a time period of from 2 hours to 3 hours at a temperature of from 70° F. to 100° F. at an atmospheric humidity of not more than 20%, then
   e. maintaining said hams at a temperature of from 35° F. to 45° F. for a period of time of from 9 to 11 days at an atmospheric humidity level of from 60% to 80%, while subjecting said hams to ultraviolet light adequate to cover at least all top and bottom surfaces of said hams, while an air flow is maintained over said hams at a rate of 1.0 to 5 feet per second whereby said cure is equalized in said ham portions, then
   f. aging said ultra-violet light treated hams for a period of from 8 to 20 days at a temperature of from 40° F. to 55° F. while said hams are maintained in an atmospheric humidity of from 45% to 80% and subjected to ultraviolet light over at least all top or bottom surfaces thereof, wherein said aging step is conducted while maintaining an air flow over said hams of from 1 to 5 feet per second, then
   g. removing excess fat and undesirable portions from said ham, cutting said hams into pieces of from ⅛ inch chunks to full muscle sections, forming said pieces into a desired shape while maintaining said ham at a temperature of from 30° F. to 45° F., then
   h. cooking said hams for a period of from 2 hours to 5 hours at a temperature in the range of from 135° F. to 155° F. and at a atmospheric humidity level in the range of from 10% to 25% to remove moisture from said hams while said hams are subjected to additional smoking at an air flow of 1.0 to 5 feet per second and where the dampers are kept closed after the first hour of this step, then
   i. chilling said hams to a temperature in the range of 55° F. to 75° F., then
   j. aging said hams for a period of from 1 day to 5 days until the ham moisture content drops to the range of from 50% to 55%, at a temperature of from 55° F. to 75° F. and an atmospheric humidity level of from 40% to 60%, while maintaining an air flow over said hams of from 2 to 5 feet per second, then
   k. packaging said ham at a temperature in the range of 25° F. to 75° F.

15. The process of claim 14 wherein said aging step f. is conducted in two separate steps:
   a. aging said hams for a period of from 2 days to 10 days at a temperature of from 40° F. to 50° F. while the atmospheric humidity surrounding said hams is maintained at a level of from 45% to 80%, wherein said forced air flow is in the range of from 1 to 5 feet per second, then
   b. further aging said hams for a period of from 2 to 10 days at a temperature of from 60° F. to 75° F. while the atmospheric humidity surrounding said hams is maintained at a level of from 40% to 60%, wherein said forced air flow is in the range of from 1 to 5 feet per second, and wherein the ham moisture content at the conclusion of this step is in the range of from 60% to 65%.

* * * * *